(12) United States Patent
Marina et al.

(10) Patent No.: US 9,879,352 B2
(45) Date of Patent: Jan. 30, 2018

(54) METHODS AND SYSTEMS FOR FUEL PRODUCTION IN ELECTROCHEMICAL CELLS AND REACTORS

(71) Applicants: Olga A. Marina, Richland, WA (US); Larry R. Pederson, Kennewick, WA (US)

(72) Inventors: Olga A. Marina, Richland, WA (US); Larry R. Pederson, Kennewick, WA (US)

(73) Assignee: BATTELLE MEMORIAL INSTITUTE, Richland, WA (US)

(*) Notice: Subject to any disclaimer, the term of this patent is extended or adjusted under 35 U.S.C. 154(b) by 477 days.

(21) Appl. No.: 14/681,857

(22) Filed: Apr. 8, 2015

(65) Prior Publication Data
US 2015/0292093 A1 Oct. 15, 2015

Related U.S. Application Data

(60) Provisional application No. 61/978,085, filed on Apr. 10, 2014.

(51) Int. Cl.
| | |
|---|---|
| *C25B 3/02* | (2006.01) |
| *C25B 11/04* | (2006.01) |
| *H01M 8/10* | (2016.01) |
| *C01B 13/02* | (2006.01) |
| *H01M 8/1011* | (2016.01) |
| *H01M 4/90* | (2006.01) |

(52) U.S. Cl.
CPC ............ *C25B 3/02* (2013.01); *C01B 13/0288* (2013.01); *C25B 11/0452* (2013.01); *C25B 11/0473* (2013.01); *H01M 4/9041* (2013.01); *H01M 8/1011* (2013.01); *H01M 8/1013* (2013.01); *Y02P 20/133* (2015.11)

(58) Field of Classification Search
CPC ....................................................... C25B 3/02
See application file for complete search history.

(56) References Cited

U.S. PATENT DOCUMENTS

| | | |
|---|---|---|
| 4,661,422 A | 4/1987 | Marianowski et al. |
| 4,802,958 A | 2/1989 | Mazanec et al. |
| 8,257,563 B2 * | 9/2012 | Hartvigsen ............... C25B 1/02 |
| | | 204/257 |

OTHER PUBLICATIONS

Xia, C., et al., Intermediate temperature fuel cell with a doped ceria-carbonate composite electrolyte, Journal of Power Sources, 195, 2010, 3149-3154.

(Continued)

*Primary Examiner* — Nicholas A Smith
(74) *Attorney, Agent, or Firm* — Derek H. Maughan

(57) ABSTRACT

Methods and systems for fuel, chemical, and/or electricity production from electrochemical cells are disclosed. A voltage is applied between an anode and a cathode of an electrochemical cell. The anode includes a metal or metal oxide electrocatalyst. Oxygen is supplied to the cathode, producing oxygen ions. The anode electrocatalyst is at least partially oxidized by the oxygen ions transported through an electrolyte from the cathode to the anode. A feed gas stream is supplied to the anode electrocatalyst, which is converted to a liquid fuel. The anode electrocatalyst is re-oxidized to higher valency oxides, or a mixture of oxide phases, by supplying the oxygen ions to the anode. The re-oxidation by the ions is controlled or regulated by the amount of voltage applied.

12 Claims, 5 Drawing Sheets

(56) References Cited

OTHER PUBLICATIONS

Di, J, et al., Samarium doped ceria-(Li/Na)2CO3 composite electrolyte and its electrochemical properties in low temperature solid oxide fuel cell, Journal of Power Sources, 195, 2010, 4695-4699.
Morgensen, M., et al., Conversion of Hydrocarbons in Solid Oxide Fuel Cells, Annu. Rev. Mater. Res., 33, 2003, 321-331.
Marina, O. A., et al., Mitigation of Sulfur Poisoning of Ni/Zirconia SOFC Anodes by Antimony and Tin, Journal of the Electrochemical Society, 158, 2011, B424-B429.
Rostrup-Nielsen, J. R., et al., Hydrogen and Synthesis Gas by Steam- and CO2 Reforming, Advances in Catalysis, 47, 2002, 65-139.
Ohler, N., et al., Study of the Elementary Processes Involved in the Selective Oxidation of Methane over Mo0x/Si02 J. Phys. Chem. B, 110, 2006, 2700-2709.
Marina, O. A., et al., Polarization-Induced Interfacial Reactions Between Nickel and Selenium in Ni/Zirconia SOFC Anodes and Comparison with Sulfur Poisoning, Journal of the Electrochemical Society, 158, 2011, B36-B43.
Polniser, R., et al., Structure and reactivity of copper iron pyrophosphate catalysts for selective oxidation of methane to formaldehyde and methanol, Applied Catalysis A: General, 400, 2011, 122-130.
Nehe, P., et al., Methanol reformation for hydrogen production from a single channel with cavities, International Journal of Hydrogen Energy, 38, 2013, 13216-13229.
Rasmussen, C. L., et al., Direct Partial Oxidation of Natural Gas to Liquid Chemicals: Chemical Kinetic Modeling and Global Optimization, Ind. Eng. Chem. Res., 47, 2008, 6579-6588.
Olah, G. A., et al., Chemical Recycling of Carbon Dioxide to Methanol and Dimethyl Ether: From Greenhouse Gas to Renewable, Environmentally Carbon Neutral Fuels and Synthetic Hydrocarbons, J. Org. Chem., 74, 2009, 487-498.
Huang, J., et al., SDC-Carbonate Composite Electrolytes for Low-Temperature SOFCs, Electrochemical and Solid State Letters, 8, 2005, A437-A440.
Huang, J., et al., A high-performance ceramic fuel cell with samarium doped ceria-carbonate composite electrolyte at low temperatures, Electrochemistry Communications, 8, 2006, 785-789.
Khammona, K., et al., Reviews on Coupling of Methane over Catalysts for Applicatoin in C2 Hydrocarbon Production, Journal of Engineering and Applied Sciences, 7, 2012, 447-455.
Reddy, P. V. L., et al., Emerging green chemical technologies for the conversion of CH4 to value added products, Renewable and Sustainable Energy Reviews, 24, 2013, 578-585.
Lunsford, J. H., Catalytic convversion of methane to more useful chemicals and fuels: a challenge for the 21st century, Catalysis Today, 63, 2000, 165-174.
Holmen, A., Direct conversion of methane to fuels and chemicals, Catalysis Today, 142, 2009, 2-8.
Alvarez-Galvan, M. C., et al., Direct methane conversion routes to chemicals and fuels, Catalysis Today, 171, 2011, 15-23.
Arutyunov, V., Low-scale direct methane to methanol—Modern status and future prospects, Catalysis Today, 215, 243-250.
Otsuka, K., et al., Direct conversion of methane into oxygenates, Applied Catalysis A: General, 222, 2001, 145-161.
Wocken, A., et al., End-Use Technology Study—An Assessment of Alternative Uses for Associated Gas, Energy & Environmental Research Center, University of North Dakota, 2013, 1-21.
Pirovano, C., et al., On the performance of porous silica supported VOx catalysts in the partial oxidation of methane, Catalysis Today, 192, 2012, 20-27.
Sun, M., et al., Catalytic Oxidation of Light Alkanes (C1—C4) by Heteropoly Compounds, Chemical Reviews, 114, 2014, 981-1019.
Benlounes, O., et al., Direct oxidation of methane to oxygenates over heteropolyanions, Journal of Natural Gas Chemistry, 17, 2008, 309-312.
Chellappa, A. S., et al., Partial Oxidation of Methane Using Ferric Molybdate Catalyst, Industrial & Engineering Chemistry Research, 34, 1995, 1933-1940.
Taylof, S. H., et al., The partial oxidation of methane to methanol: An approach to catalyst design, Catalysis Today, 42, 1998, 217-224.
Zhen, K. J., et al., Partial Oxidation of Methane with Nitrous Oxide over V2O5—SiO2 Catalyst, Journal of Catalysis, 94, 1985, 501-507.
Chempath, S., et al., A DFT study of the mechanism and kinetics of methane oxidation to formaldehyde occuring on silica-supported molybdena, Journal of Catalysis, 247, 207, 119-126.
Foulds, G. A., et al., Homogeneous gas-phase partial oxidation of methane to methanol and formaldehyde, Fuel Processing Technology, 42, 1995, 129-150.
Barbero, M. C., et al., Breakthrough in the direct conversion of methane into C1-oxygenates, Chem. Comm. 2002, 1184-1185.
Claridge, J. B., et al., Redox properties of molten salts for methane activation, Catalysis Letters, 21, 1993, 123-131.
Lee, B.-J., et al., The Partial Oxidation of Methane to Methanol with Nitrite and Nitrite Melts, A Journal of Chemical Sciences, 53, 1998, 679-682.
de Lucas-Consuegra, A., et al., Enhancing the catalytic activity and selectivity of the partial oxidation of methanol by electrochemical promotion, Journal of Catalysis, 293, 2012, 149-157.
Lee, B.-J., et al. The Promotive Properties of Alkali Metal Nitrite Melts for the Partial Oxidation of Methane to Methanol, A Journal of Chemical Sciences, 53, 1998, 249-255.
Bebelis, S., et al., Non-Faradaic Electrochemical Modification of Catalytic Activity, 6. Ethylene Epoxidation on Ag Deposited on Stabilized ZrO2, Journal of Catalysis, 13, 1992, 588-610.
Stoukides, M., Electrochemical studies of methane activation, Journal of Applied Electrochemistry, 25, 1995, 899-912.
Stoukides, M., Methane conversion to C2 hydrocarbons in solid electrolyte membrane reactors, Research on Chemical Intermediates, 32, 3-4, 2006, 187-204.
Vernoux, P., et al., Ionically Conducting Ceramics as Active Catalyst Supports, Chemical Reviews, 113, 2013, 8192-8260.
Belyaev, V. D., et al., Oxidative conversion of CH4 on Ni and Ag electrode-catalysts in molten carbonate fuel cell reactor, Catalysis Letters, 17, 1993, 213-221.
Khammona, K. et al., Reviews on Coupling of Methane over Catalysts for Application in C2 Hydrocarbon Production, Journal of Engineering and Applied Sciences, 7, 7, 2012, 447-455.
Lee, B., et al., Efficient and selective formation of methanol from methane in a fuel cell-type reactor, Journal of Catalysis, 279, 2011, 233-240.
Lee, B., et al., Direct oxidation of methane to methanol over proton conductor/metal mixed catalysts, Journal of Catalysis, 271, 2010, 195-200.
Rocha, R. S., et al., Electrosynthesis of methanol from methane: The role of V2O5 in the reaction of selectivity for methanol of a TiO2/RuO2/V2O5 gas diffusion electrode, Electrochimica Acta, 87, 2013, 606-610.
Wang, X., et al., Novel core-shell SDC/amorphous Na2CO3 nanocomposite electrolyte for low-temperature SOFCs Electrochemistry Communications, 10, 2008, 1617-1620.
Wang, X., et al., State of the art ceria-carbonate composites (3C) electrolyte for advanced low temperature ceramic fuel cells (LTCFCs), International Journal of Hydrogen Energy, 37, 2012, 19417-19425.
Norby, T., Solid-state protonic conductors: principles, properties, progress and prospects, Solid State Ionics, 125, 1999, 1-11.
Fan, L., et al., Recent development of ceria-based (nano) composite materials for low temperature ceramic fuel cells and electrolyte-free fuel cells, Journal of Power Sources, 234, 2013, 154-174.
Gao, Z., et al., Development of methanol-fueled low-temperature solid oxide fuel cells, International Journal of Energy Research, 365, 2011, 690-696.
Mat, M. D., et al., Developments of cathodes for methanol and ethanol fuelled low temperature (300-600 C.) solid oxide fuel cells, International Journal of Hydrogen Energy, 32, 2007, 796-801.

(56) References Cited

OTHER PUBLICATIONS

Zhu, B., Advantages of intermediate temperature solid oxide fuel cells for tractionary applications, Journal of Power Sources, 93, 2001, 82-86.

Huang, J., et al., Development of solid oxide fuel cell materials for intermediate-to-low temperature operation, International Journal of Hydrogen Energy, 37, 2012, 877-883.

Feng., B., et al., Catalysts and Performances for Direct Methanol Low-Temperature (300 to 66 C.) Solid Oxide Fuel Cells, Electrochemical and Solid-State Letters, 9, 2, 2006, A80-A81.

Gao, Z., et al., Development of trimetallic Ni—Cu—Zn anode for low temperature solid oxide fuel cells with composite electrolyte, International Journal of Hydrogen Energy, 35, 2010, 12897-12904.

Gao, Z., et al., Preparation and characterization of $Sm_{0.2}Ce_{0.8}O_{1.9}$/$Na_2CO_3$ nanocomposite electrolyte for low-temperature solid oxide fuel cells.

Raza, R., et al., Advanced Multi-Fuelled Solid Oxide Fuel Cells (ASOFCs) Using Functional Nanocomposites for Polygeneration, Advanced Energy Materials, 1, 2011, 1225-1233.

Xu, S., et al., Carbon doped MO—SDC material as an SOFC anode, Journal of Power Sources, 165, 2007, 82-86.

Matus, Y. B., et al., Metal-supported solid oxide fuel cell membranes for rapid thermal cycling, Solid State Ionics, 176, 2005, 443-449.

Tucker, M. C., et al., Performance of metal-supported SOFCs with infiltrated electrodes, Journal of Power Sources, 171, 2007, 477-482.

Villarreal, I., et al., Metal-Supported Solid Oxide Fuel Cells, Electrochemical and Solid-State Letters, 6, 2003, A178-A179.

Visco, S. J., et al., Development of Low-Cost Alloy Supported SOFCs, Lawrence Berkeley National Laboratory, Materials Sciences Division, 2003, 53-.

Kurokawa, H., et al., Water-based binder system for SOFC porous steel substrates, Journal of Processing Technology, 182, 2007, 469-476.

Zhu, B., Functional ceria-solt-composite materials for advanced ITSOFC applications, Journal of Power Sources, 114, 2003, 1-9.

Maric, R., et al., Flame-Based Technologies and Reactive Spray Deposition Technology for Low-Temperature Solid Oxide Fuel Cells: Technical and Economic Aspects, Journal of Thermal Spray Technology, 20, 2011, 696-718.

Zhu, B., et al., Innovative solid carbonate-ceria composite electrolyte fuel cells, Electrochemistry Communications, 3, 2001, 566-571.

Adams, A. M., et al., The High Pressure Hydrogen-Oxygen Cell, Fuel Cells, 1963, Academic Press, 129-192.

International Search Report/Written Opinion for International Application No. PCT/US2015/025050, International Filing Date Apr. 9, 2015, dated Sep. 30, 2015.

\* cited by examiner

METHODS AND SYSTEMS FOR FUEL PRODUCTION IN ELECTROCHEMICAL CELLS AND REACTORS

CROSS-REFERENCE TO RELATED APPLICATIONS

This application claims priority to U.S. Provisional Application Ser. No. 61/978,085, filed Apr. 10, 2014, titled "LIQUID FUEL PRODUCTION IN FUEL CELLS AND ELECTROCHEMICAL REACTORS," hereby incorporated by reference in its entirety for all of its teachings.

STATEMENT REGARDING FEDERALLY SPONSORED RESEARCH OR DEVELOPMENT

This invention was made with Government support under Contract DE-AC0576RLO1830 awarded by the U.S. Department of Energy. The Government has certain rights in the invention.

TECHNICAL FIELD

This invention relates to electrochemical cells. More specifically, this invention relates to a method of fuel production wherein an anode electrocatalyst is oxidized to higher valency oxides or a mixture of oxide phases, following a gas to fuels conversion, by supplying a voltage controlled oxygen ion flux to the anode.

BACKGROUND

The direct conversion of gases to liquid fuels and chemicals is highly sought, especially at low-scale to more effectively utilize remote natural gas resources. Direct conversion has proven to be a very difficult problem, because gases such as methane are highly unreactive, though tend to over-oxidize once activated. Liquid fuels such as methanol are primarily produced today by the steam reformation of methane at high temperatures and pressures to synthesis gas (carbon monoxide plus hydrogen), followed by catalytic conversion at intermediate temperatures and high pressures. Though highly selective, this technology is not well suited for low production wellheads.

The development of methods to directly convert low cost gases to valuable liquid fuels and chemicals that are easily transportable is highly sought. The need is especially great at low-scale, such as at low-volume wellheads in oilfields where considerable quantities of valuable natural gas must be flared. A compact, portable device that requires minimal maintenance and is easily installed and operated at remote sites would be especially valuable to better utilize available resources. Methanol is a particularly valued product, with a high volumetric energy density and easily transported.

Despite substantial research efforts directed at the direct conversion of low cost gases to higher value fuels for the past few decades, no viable commercial process has emerged while avoiding conditions that could lead to deep fuel oxidation.

Selective oxidation presents at least two significant challenges: 1) how to activate C—H bonds using the lowest amount of energy possible to initiate the transformation and 2) how to harness the oxidation reaction driven by thermodynamics to selectively targeted compounds while in the presence of oxygen. For example, the strength of the C—H bond in methane is 440 kJ/mol, while that in methanol is 389 kJ/mol). Thus, the C—H bond in methane is stronger than in the possible products meaning that the products will be more reactive than methane. Table 1 summarizes direct methane to methanol technologies and their status.

TABLE 1

Methane to Methanol Technologies.

| Route | Reaction type | Catalyst | Issues |
|---|---|---|---|
| High temperature | Radical, gas-phase homogeneous | none | Low selectivity |
| Intermediate temperature | Heterogeneous catalytic | metal oxides ($VO_x$, $FeO_x$, $MoO_x$), metal alloys (Cu/Zn) | Low selectivity and yield |
| Low temperature | Homogeneous catalytic in solution | Pt(II) &Pt(IV) complexes; organometalic complex | Complex and costly |
| Ambient conditions | Heterogeneous catalytic | enzymes | Low conversions, not practical |

Considering the reaction conditions (elevated temperature and strong oxidant), the selectivity is a real challenge.

SUMMARY

The present invention is directed to methods and systems for fuel production, including converting gases into liquid fuels, chemicals, and/or electricity. In one embodiment, a method of converting gases into fuels is disclosed. The method includes applying a voltage between an anode and a cathode of an electrochemical cell. The anode includes a metal oxide electrocatalyst. The method also includes supplying oxygen to the cathode which produces oxygen ions. The anode electrocatalyst is partially oxidized by the oxygen ions transported through an electrolyte from the cathode to the anode. The method further includes supplying a feed gas stream to the anode electrocatalyst, wherein the feed gas stream is at least partially oxidized by the anode electrocatalyst. The method also comprises re-oxidizing the anode electrocatalyst by supplying the oxygen ions to the anode. Oxygen ion flux is controlled, limited, or regulated by the amount of voltage applied. The anode electrocatalyst is re-oxidized to higher valency oxides or a mixture of oxide phases.

In one embodiment, the feed gas stream is, but not limited to, methane. In one embodiment, the liquid fuel is, but not limited to, methanol or formaldehyde.

The anode electrocatalyst comprises oxides of at least one of the following: Co, Cu, Fe, Mn, Mo, Sb, Ga, Zn, P, Ce, W, Ti, Sn, Zn, Nd, Bi, Re, Ru, Rh, Ga, Cs, or V.

In one embodiment, the cathode is a lithiated composite material and the electrolyte is a composite material.

The cathode can be, but is not limited to, a lithiated nickel oxide material. The electrolyte includes, but is not limited to, doped cerium oxide, alkaline carbonate, sodium carbonate, or combinations thereof.

In another embodiment of the present invention, a method of producing electricity from gases is disclosed. The method includes applying a voltage between an anode and a cathode of a first electrochemical cell, wherein the anode includes a metal, a metal or a metal oxide electrocatalyst or mixtures thereof. The method further includes supplying oxygen to the cathode which produces oxygen ions, wherein the anode electrocatalyst is at least partially oxidized by the oxygen ions transported through an electrolyte from the cathode to the anode. The method also includes supplying a feed gas stream to the anode electrocatalyst, wherein the feed gas stream is at least partially oxidized by the anode electrocatalyst and converted to a liquid fuel, and the anode electrocatalyst is re-oxidized by the oxygen ions. The extent of the re-oxidation by the oxygen ions is controlled by the voltage applied. The method also includes oxidizing the liquid fuel over a second anode electrocatalyst of a second electrochemical cell to produce electricity. The oxygen lost by the second anode electrocatalyst in oxidizing the liquid fuel is replenished by oxygen ions through a second cathode and electrolyte of the second electrochemical cell.

In one embodiment, the second anode electrocatalyst comprises Ni alloys of at least one of the following: Mo, W, Co, Cu, Fe, Sb, Sn, P, and Zn.

In one embodiment, the first and second cathodes comprise a lithiated composite material and the first and second electrolytes comprise a composite material.

In another embodiment of the present invention, an electrochemical cell for converting gases to fuels is disclosed. The cell includes a metal or metal oxide-based electrocatalyst, a porous cathode, and an electrolyte. The cell further includes a voltage applied between the anode electrocatalyst and the cathode. The cell also includes oxygen supplied to the cathode which produces oxygen ions, wherein the anode electrocatalyst is at least partially oxidized by the oxygen ions. A feed gas stream is supplied to the anode electrocatalyst, wherein the feed gas stream is at least partially oxidized by the anode electrocatalyst. The anode electrocatalyst is re-oxidized by the oxygen ions, and the re-oxidation is controlled or limited by the applied voltage.

In another embodiment of the present invention, a system for converting gases to fuels and electricity is disclosed. The system includes a first electrochemical cell including a metal oxide-based anode electrocatalyst, wherein a feed gas stream is supplied to the metal oxide-based anode electrocatalyst and converted to a liquid fuel. The system also includes a second electrochemical cell including a nickel alloy anode electrocatalyst, wherein the liquid fuel is supplied to the nickel alloy anode electrocatalyst to produce electricity. The metal oxide anode electrocatalyst and the nickel alloy anode electrocatalyst are re-oxidized by oxygen ion flux in each cell, which is controlled by a bias potential on each cell.

In one embodiment, the first cell and the second cell share a common support, cathode, and electrolyte.

In one embodiment, the system further comprises a stack of electrochemical cells, which includes an interconnect between the cells.

DETAILED DESCRIPTION OF THE PREFERRED EMBODIMENTS

The following description includes the preferred best mode of embodiments of the present invention. It will be clear from this description of the invention that the invention is not limited to these illustrated embodiments but that the invention also includes a variety of modifications and embodiments thereto. Therefore the present description should be seen as illustrative and not limiting. While the invention is susceptible of various modifications and alternative constructions, it should be understood, that there is no intention to limit the invention to the specific form disclosed, but, on the contrary, the invention is to cover all modifications, alternative constructions, and equivalents falling within the spirit and scope of the invention as defined in the claims.

The present invention includes methods and system for converting low-cost gases to higher-value liquids, fuels, and/or electricity, enabling the more efficient use of both electricity and natural gas resources.

Mixed metal oxide-based anode electrocatalysts have been developed for use in an electrochemical cell where low-cost gases will be converted to higher-value fuels, chemicals, and/or electricity. In one embodiment, the electrocatalyst is composed of oxides such as Co, Cu, Fe, Mn, Mo, Sb, Ga, Zn, P, Ce, W, Ti, Sn, Zn, Nd, Bi, Re, Ru, Rh, Ga, Cs, and V oxides, which have sufficient oxidizing power to at least partially oxidize a feed gas stream or low-cost gas. In one example, the anode electrocatalyst oxidizes methane to either methanol or formaldehyde. Oxygen lost from the electrocatalyst in partially oxidizing the feed gas stream is replenished by oxygen ion flux through an electrolyte of the electrochemical cell, and the oxygen ion flux is controlled by a bias potential on the cell.

Figure 1:
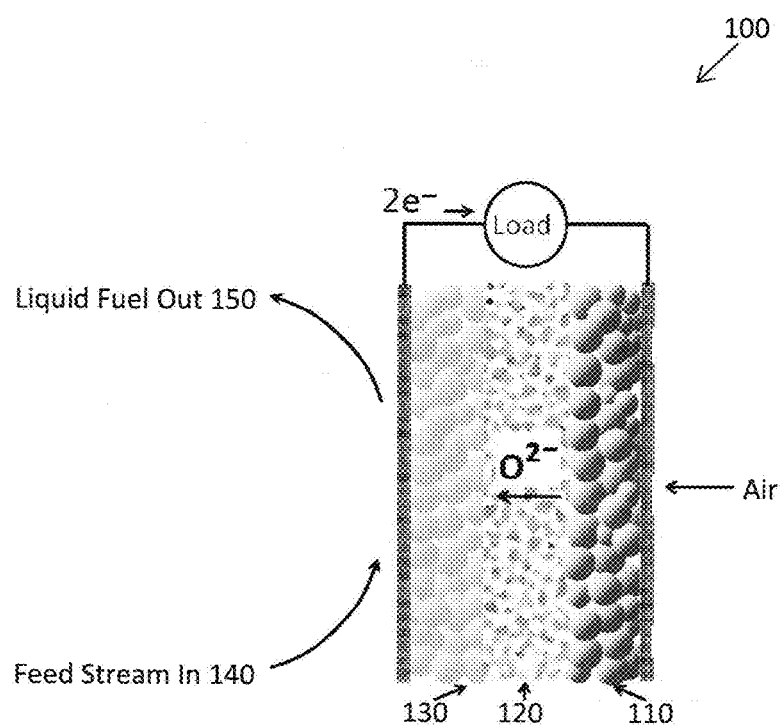
FIG. 1 is a schematic diagram of an electrochemical cell for converting gases to liquids, in accordance with one embodiment of the present invention.

FIG. 1 is a schematic diagram of an electrochemical cell 100 for converting gases to liquids, in accordance with one embodiment of the present invention. The electrochemical cell 100, which may be an electrochemical reactor or fuel production cell, includes an anode 130, an electrolyte 120, and a cathode 110.

The anode 130 includes a metal or metal-oxide electrocatalyst or mixtures thereof. The electrocatalyst composition may be composed of, but is not limited to, at least one of the following: Co, Cu, Fe, Mn, Mo, Sb, Ga, Zn, P, Ce, W, Ti, Sn, Nd, Bi, Re, Ru, Rh, Ga, Cs, or V. Selectivity and yield are enhanced by electrochemically maintaining a desired redox state or oxygen "buffer" in the metal oxides that exhibit activity for direct gas-to-liquid conversion, while avoiding conditions that lead to over or deep oxidation.

The cathode 110, which is porous, allows oxygen to pass through to partially oxidize the anode 130. In one embodiment, the cathode 130 is a lithiated composite material such as lithiated nickel oxide.

The electrolyte 120 may be, but is not limited to, a composite material. The composite electrolyte can be a samarium oxide doped cerium oxide or $CeO2-Na_2CO_3$ composite.

Still referring to FIG. 1, a feed stream 140 is fed to the anode 130 side of the cell 100 for reaction with the anode electrocatalyst. The feed stream 140 is converted to a liquid fuel 150 during the reaction, and the oxygen lost by the anode electrocatalyst in oxidizing the feed stream 140 is replenished by oxygen ion flux, e.g. $O^{2-}$, pumped into the cell 100. As such, the anode will take the $O^{2-}$ ions and the metal or metal oxide in the anode will be oxidized to higher valency oxides or a mixture of oxide phases. The oxygen ion flux is at least partially controlled or regulated by the voltage applied between the anode 130 and the cathode 110 through the load. At lower voltages, the flux of oxygen-containing species is lower. Likewise, at higher voltages, the flux of oxygen-containing species is increased.

Figure 2:
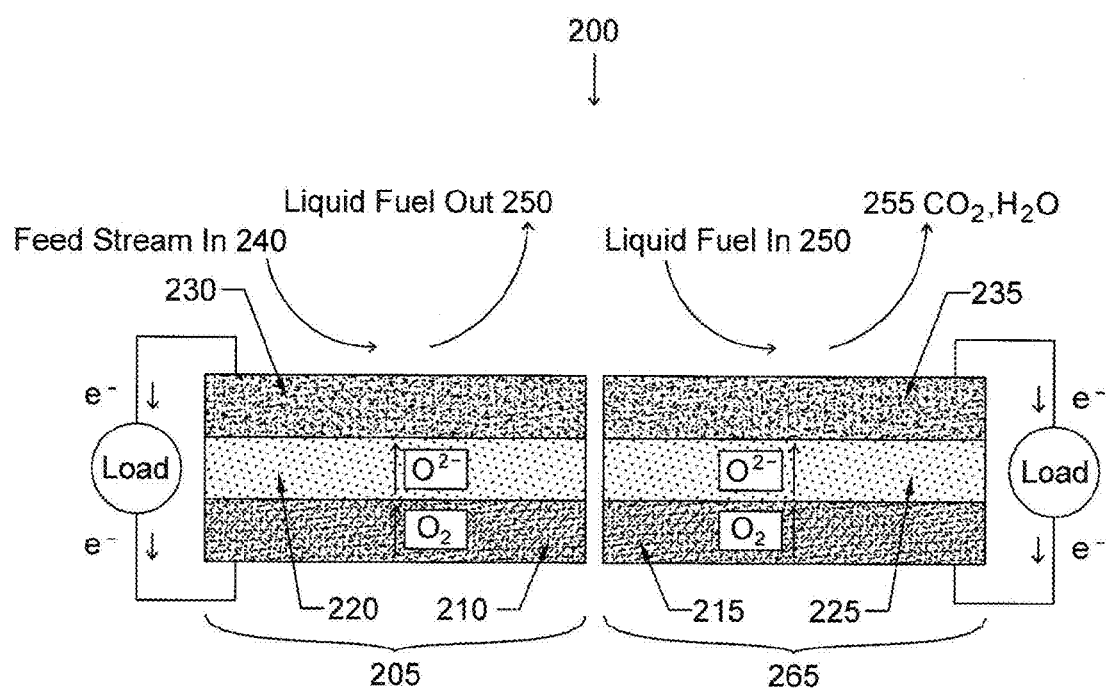
FIG. 2 is a schematic diagram of a system for converting gases to liquids and electricity, in accordance with one embodiment of the present invention.

FIG. 2 is a schematic diagram of a system 200 for converting gases to liquids and electricity, in accordance with one embodiment of the present invention. The system 200 includes a first electrochemical cell 205 for fuel generation or production and a second electrochemical cell 265 for electricity production. The first electrochemical cell 205, which is similar to the cell 100 of FIG. 1, includes anode 230, cathode 210, and electrolyte 220. Voltage is applied between the anode 230 and the cathode 210 through the load. The feed stream 240 is converted to liquid fuel 250 by the first electrochemical cell 205. In this fuel generation mode, the anode catalyst is at least partially oxidized by the oxygen ions, shown as $O^{2-}$, flowing through the electrolyte 220 from the cathode 210. The oxidized anode is then re-reduced through reactions with the feed stream 240.

The second electrochemical cell 265 also includes an anode 235, a cathode 215, and an electrolyte 225. The anode 235 also includes an electrocatalyst. The electrocatalyst composition of the anode 235 may be composed of, but is not limited to, a nickel alloy. The cathode 215 and the electrolyte 225 may be composed of the same cathode and electrolyte materials as used in the first electrochemical cell 205, but can be different materials.

The liquid fuel 250 is supplied to the anode side of the cell 265, where it is oxidized by oxygen ion flux flowing from the cathode 215 through the electrolyte 225. This oxygen ion flux is also controlled by cell voltage on the cell 265. The reactions between the liquid fuel 240 and the oxygen ions produce water, carbon dioxide, and electricity. Other fuels may be produced as well depending on the feed stream. The anode material of the cell 265 includes nickel, which can be additionally alloyed with other elements, such as Mo, W, Co, Cu, Fe, Sb, Sn, P, and Zn, to lower the tendency for fuel cracking without impeding the activity.

Figure 3:
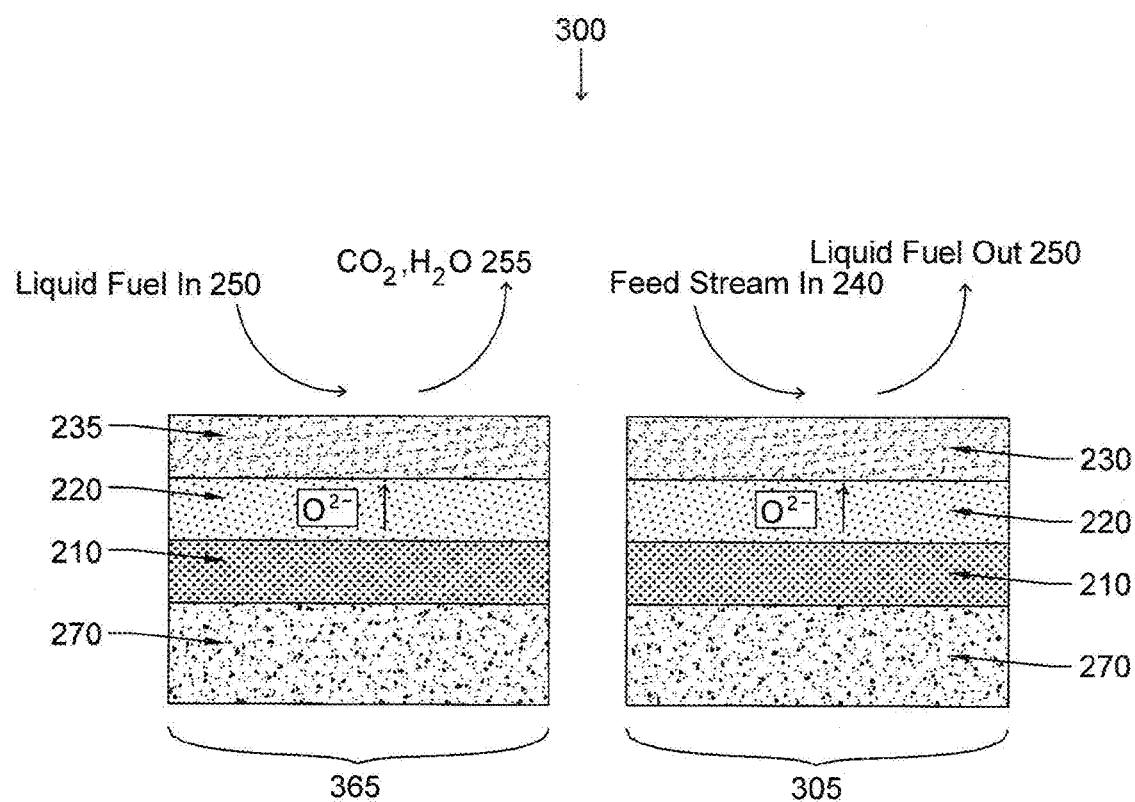
FIG. 3 is a schematic diagram of a system for converting gases to liquids, in accordance with one embodiment of the present invention.

FIG. 3 is a schematic diagram of a system 300 for converting gases to liquids, in accordance with one embodiment of the present invention. The system 300 is, in many ways, similar to the system 200 of FIG. 2, with the addition of a support structure or substrate 270. The support 270, cathodes 210, and electrolytes 220 for each cell 305 and 360 may be composed of the same material. The anodes 230 and 235 are composed of the different materials. In one embodiment, the support 270 is a porous ferritic steel/ceramic support, onto which a porous Li—NiO cathode and a fully dense ceria/alkali carbonate electrolyte are deposited. As an alternative, the porous ceramic will be the support structure. The porous cathode 210 itself can serve as the ceramic support structure as well.

In one specific embodiment, a cermet consisting of a FeCr ferritic stainless steel combined with an aluminum iron titanate ceramic phase ($Al_{1.57}Fe_{0.43}TiO_5$, AFT) is used as the structural support. The addition of the low-expansion AFT ceramic phase enables the thermal expansion coefficient of the composite to be adjusted to best match that of other electrochemical cell components. Steel and AFT powders may be mixed with water-based binders composed of acrylic polymer suspensions with polyethylene glycol pore formers and processed by firing in forming gas. The thickness may be ~2 mm, with ~50% porosity to allow adequate gas flow.

The formation of a conductive passivation layer rich in chromium oxide, combined with intermediate operating temperatures, enables the cermet composite support to be used on either the cathode or anode side.

In one embodiment, lithiated NiO is used as the cathode. The cathode can be applied by tape-casting methods. An alternative, potentially low cost method is to deposit the cathode directly onto the cermet support using reactive spray deposition technology (RSDT), PVD, and/or plasma spray processing. RSDT flame based processing can produce fuel cell layers more rapidly than traditional techniques, and with no need for high-temperature sintering steps. RSDT can therefore potentially reduce the manufacturing cost and capital cost required, as well as the material costs, by allowing for thinner deposited layers.

In one embodiment, the doped cerium oxide/alkali carbonate materials can be used as the electrolyte. Superionic conductivity in these composites has been attributed to a substantially higher defect concentration near phase boundaries and a high degree of disorder at those interfaces. Simultaneous oxygen ion and proton conductivity has been reported, with transference numbers for protons of 0-0.5 and for oxygen ions from 0.5 to 1.0. Mixed proton and oxygen ion conduction can be of significant benefit for both fuel cell and fuel production cell modes, particularly with regard to activation of non-hydrogen fuels.

In one embodiment, the anode for the electricity production cell includes a nickel-based electrocatalyst. The nickel can be alloyed with Mo, W, Co, Cu, Fe, Sb, Sn, P, and Zn, alone or in combination to decrease Ni tendency for hydrocarbon fuel cracking Effective Ni alloy-based anodes enable effective utilization of alcohol and other biofuels. Dilute alloys of Ni with Sn and Sb are also effective in improving the sulfur tolerance of SOFC anodes, without diminishing its activity. Other possible anodes include metal oxide or metal oxide/ceria/carbon composites. As one example, a Ni alloy/ceria composite electrocatalyst enables effective utilization of methanol and related fuels.

In one embodiment, the anode for the fuel production cell includes a metal oxide-based anode electrocatalyst, where a gas feed stream such as methane will be converted to liquid fuels. The anode electrocatalyst is composed of metal oxides including, but not limited to, Co, Cu, Fe, Mn, Mo, Sb, Ga, Zn, P, Ce, W, Ti, Sn, Zn, Nd, Bi, Re, Ru, Rh, Ga, Cs, and/or V. These metal oxide couples have sufficient oxidizing power to partially oxidize methane to either $CH_3OH$ or HCHO. Oxygen lost from the electrocatalyst in partially oxidizing the feed stream is replenished by the oxygen ion flux through the electrolyte, controlled by the bias potential on the cell, shown schematically in FIG. 3.

Figure 4:
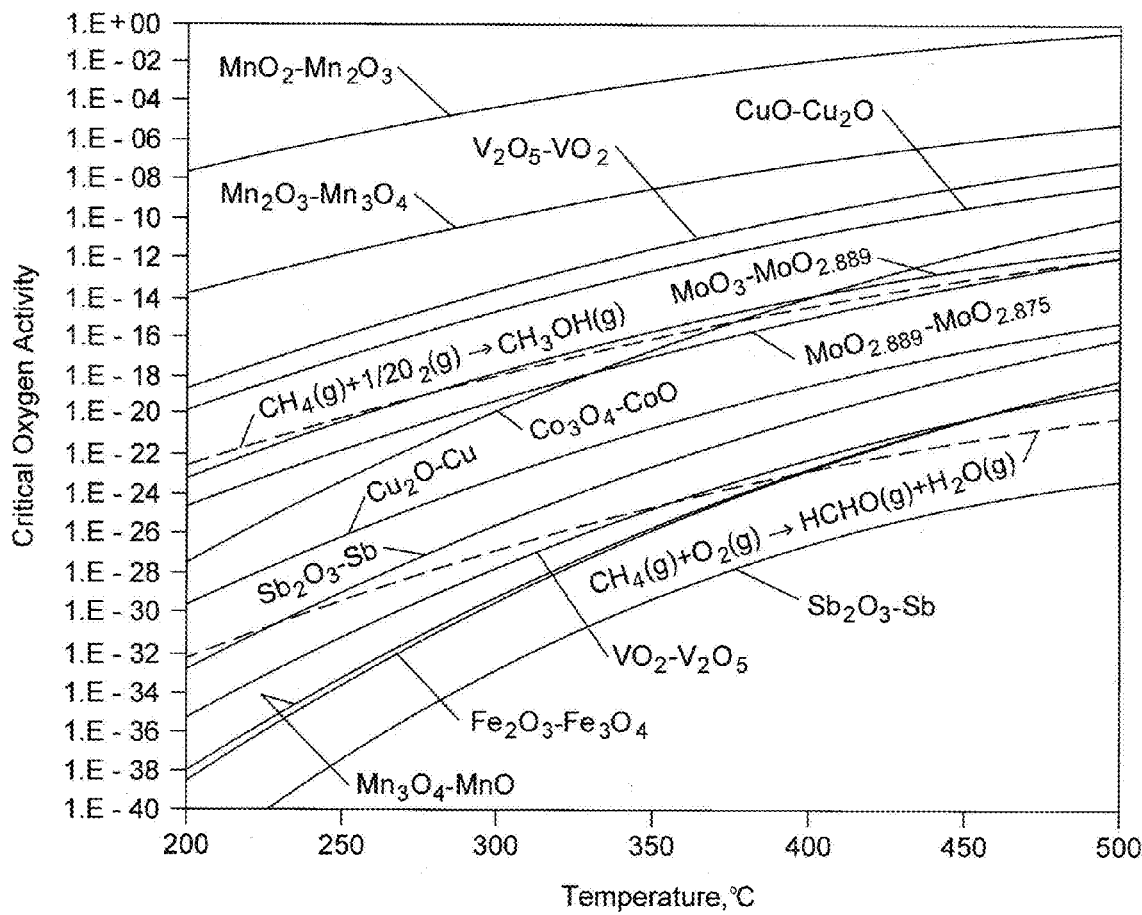
FIG. 4 shows critical oxygen partial pressures over metal oxide redox couples (solid lines) as a function of temperature and compares them to minimum oxygen activities required for partial oxidation of methane to methanol and formaldehyde (dashed lines).

FIG. 4 shows critical oxygen partial pressures over metal oxide redox couples (solid lines) as a function of temperature and compares them to minimum oxygen activities required for partial oxidation of methane to methanol and formaldehyde (dashed lines).

Polarization at the anode of the electrochemical cells can drive the formation of new phases at the electrolyte/electrode interface that may not be possible elsewhere in the cell. Thus, anodic polarization is used in the present invention to "tune" the oxygen activity at the active interface. Selectivity and yield will be enhanced by electrochemically maintaining a desired redox state (oxygen buffer) in metal oxides that exhibit activity for certain gas to liquids conversion, while avoiding conditions that could lead to deep oxidation of the feed stream.

Figure 5:
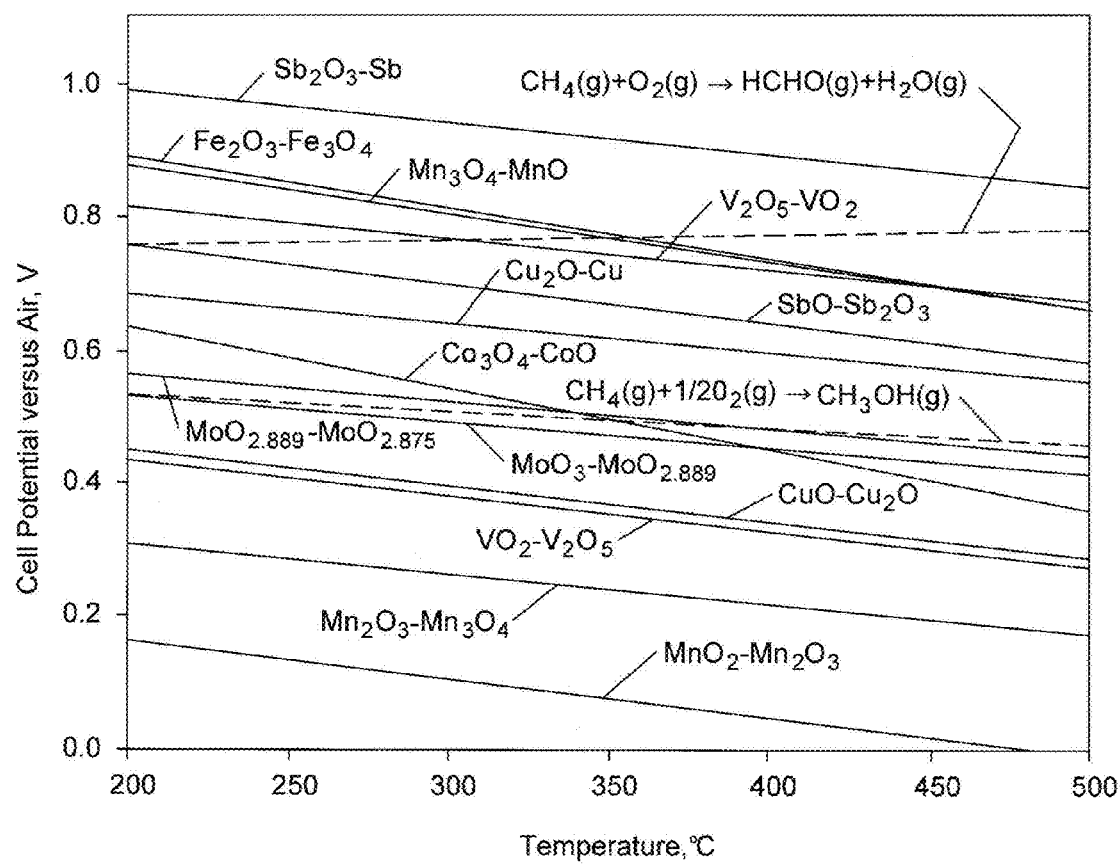
FIG. 5 shows cell potential versus air as a function of temperature to partially oxidize methane to methanol and formaldehyde (dashed lines) and the oxygen activities produced by metal oxide redox couples (solid lines).

FIG. 5 shows cell potential versus air as a function of temperature to partially oxidize methane to methanol and formaldehyde (dashed lines) and the oxygen activities produced by metal oxide redox couples (solid lines).

Experimental Section

The following examples serve to illustrate embodiments and aspects of the present invention and should not be construed as limiting the scope thereof.

Electrochemical Conversion of Methane to Methanol and Formaldehyde

The fuel production cell would utilize the same support, cathode, and electrolyte as was described in connection with FIG. 3 above. Following FIGS. 4 and 5 to achieve the minimum oxygen activity needed to oxidize methane to methanol, the cell would operate at <~0.5 V at 450° C., while formaldehyde synthesis calls for a cell potential of <~0.75V. Formaldehyde is typically produced by methanol oxidation, so it may not be possible to convert methane directly to formaldehyde. The oxygen activity at the anode/electrolyte is determined by (1) the thermodynamics of the particular redox couple (this defines the cell open circuit voltage), and (2) the anodic overpotential. The anodic overpotential, the result of faradaic processes with current flow, renders the interface more oxidizing than elsewhere in the anode, providing much greater flexibility with respect to choice of anode materials than the redox couple alone. The oxygen most able to convert methane to liquid fuels is available at the active interface. By choosing metal oxide electrocatalysts that have promise for methanol synthesis, and by carefully regulating their oxygen activity, high selectivity can be achieved.

Total polarization losses up to about 0.3 V are anticipated at a current density of approximately 100 mA/cm$^2$. The allowable cell resistance is thus approximately 0.3V/0.1 A/cm$^2$≤3 ohms-cm$^2$, most of which will arise from anode reactions.

The present invention includes electrochemical technology that converts low-cost gases to higher-value fuels and other liquids in the fuel production electrochemical cell and produces electricity from the liquids and other fuels in the electricity production electrochemical cell, by controlling the oxygen activity of the anode electrocatalyst. These cells can also be operated at intermediate temperatures.

As one example, the methods and systems of the present invention can convert low-cost natural gas to high-value alcohol fuels and chemical intermediates at commercially competitive capital and operating costs. This would be especially valuable at low-scale at the wellhead and at landfill sites, in addition to traditional chemical processing plant settings. The present invention enables the more efficient use of both electricity and natural gas resources, by producing liquid fuels during periods of excess renewable energy capacity, and by converting those liquid fuels back to electricity in periods of greater need.

While a number of embodiments of the present invention have been shown and described, it will be apparent to those skilled in the art that many changes and modifications may be made without departing from the invention in its broader aspects. The appended claims, therefore, are intended to cover all such changes and modifications as they fall within the true spirit and scope of the invention.

We claim:

1. A method of converting lower-cost gases into higher-value fuels and chemicals, comprising:
    a. applying a voltage between an anode and a cathode of an electrochemical cell, wherein the anode includes a metal oxide electrocatalyst;
    b. supplying oxygen to the cathode which produces oxygen ions, wherein the anode electrocatalyst is at least partially oxidized by the oxygen ions transported through an electrolyte from the cathode to the anode; and
    c. supplying a feed gas stream to the anode electrocatalyst, wherein the feed gas stream is at least partially oxidized by the anode electrocatalyst; and
    d. re-oxidizing the anode electrocatalyst by supplying the oxygen ions to the anode, the extent of which is controlled by the voltage applied.

2. The method of claim 1 wherein the anode electrocatalyst is re-oxidized to higher valency oxides or a mixture of oxide phases.

3. The method of claim 1 wherein the feed gas stream is methane and the liquid fuel is methanol or formaldehyde.

4. The method of claim 1 wherein the anode electrocatalyst comprises oxides of at least one of the following: Co, Cu, Fe, Mn, Mo, Sb, Ga, Zn, P, Ce, W, Ti, Sn, Zn, Nd, Bi, Re, Ru, Rh, Ga, Cs, and V.

5. The method of claim 4 wherein the cathode is a lithiated composite material and the electrolyte is a composite material.

6. The method of claim 5 wherein the cathode is a lithiated nickel oxide material and the electrolyte is selected from the group consisting of: doped cerium oxide, alkali carbonate, sodium carbonate, and combinations thereof.

7. A method of producing electricity from gases comprising:
    a. applying a voltage between an anode and a cathode of a first electrochemical cell, wherein the anode includes a metal or a metal oxide electrocatalyst or their mixture;
    b. supplying oxygen to the cathode which produces oxygen ions, wherein the anode electrocatalyst is at least partially oxidized by the oxygen ions transported through an electrolyte from the cathode to the anode;
    c. supplying a feed gas stream to the anode electrocatalyst, wherein the feed gas stream is at least partially oxidized by the anode electrocatalyst and converted to a liquid fuel, and wherein the anode electrocatalyst is re-oxidized by the oxygen ions, the extent of which is controlled by the voltage applied; and
    d. oxidizing the liquid fuel over a second anode electrocatalyst of a second electrochemical cell to produce electricity.

8. The method of claim 7 wherein oxygen lost by the second anode electrocatalyst in oxidizing the liquid fuel is re-oxidized by oxygen ions through a second cathode and electrolyte of the second electrochemical cell.

9. The method of claim 7 wherein the second anode electrocatalyst comprises Ni alloys of at least one of the following: Mo, W, Co, Cu, Fe, Sb, Sn, P, and Zn.

10. The method of claim 7 wherein the feed gas stream is methane and the liquid fuel is methanol or formaldehyde.

11. The method of claim 7 wherein the anode electrocatalyst comprises oxides of at least one of the following: Co, Cu, Fe, Mn, Mo, Sb, Ga, Zn, P, Ce, W, Ti, Sn, Zn, Nd, Bi, Re, Ru, Rh, Ga, Cs, and V.

12. The method of claim 11 wherein the first and second cathodes comprise a lithiated composite material and the first and second electrolytes comprise a composite material.

* * * * *